United States Patent
Rousseau et al.

(10) Patent No.: US 9,661,297 B2
(45) Date of Patent: May 23, 2017

(54) PICTURES POSITIONING ON DISPLAY ELEMENTS

(71) Applicant: Essilor International (Compagnie Générale d'Optique), Charenton-le-Pont (FR)

(72) Inventors: Denis Rousseau, Charenton-le-Pont (FR); Vincent Roptin, Charenton-le-Pont (FR)

(73) Assignee: Essilor International (Compagnie Générale d'Optique), Charenton-le-Pont (FR)

( * ) Notice: Subject to any disclaimer, the term of this patent is extended or adjusted under 35 U.S.C. 154(b) by 61 days.

(21) Appl. No.: 14/421,959

(22) PCT Filed: Aug. 13, 2013

(86) PCT No.: PCT/EP2013/066855
§ 371 (c)(1),
(2) Date: Feb. 16, 2015

(87) PCT Pub. No.: WO2014/026957
PCT Pub. Date: Feb. 20, 2014

(65) Prior Publication Data
US 2015/0222870 A1 Aug. 6, 2015

(30) Foreign Application Priority Data
Aug. 16, 2012 (EP) .................... 12306006

(51) Int. Cl.
G09G 5/00 (2006.01)
H04N 13/04 (2006.01)
H04N 13/00 (2006.01)

(52) U.S. Cl.
CPC ..... *H04N 13/0022* (2013.01); *H04N 13/0051* (2013.01); *H04N 13/044* (2013.01); *H04N 13/0497* (2013.01); *H04N 2213/002* (2013.01)

(58) Field of Classification Search
CPC ............. H04N 13/0022; H04N 13/044; H04N 13/0051; H04N 13/0497; H04N 2213/002
(Continued)

(56) References Cited

U.S. PATENT DOCUMENTS 3,053,135 A * 9/1962 Nawokich Tanaka ............... G02B 27/2221 352/86
3,543,666 A * 12/1970 Kazel .................... G02B 7/305 356/3.16

(Continued)

FOREIGN PATENT DOCUMENTS

EP 2061261 5/2009
JP 7129095 5/1995

(Continued)

OTHER PUBLICATIONS

Extended European Search Report and the European Search Opinion dated Nov. 15, 2012, for European Application No. 12306006.3 (7 pages).

(Continued)

*Primary Examiner* — Prabodh M Dharia
(74) *Attorney, Agent, or Firm* — McGuireWoods LLP

(57) ABSTRACT

A pictures positioning system and method for positioning pictures on display elements of a binocular displaying device is described. The binocular displaying device comprises a right and a left display element to be placed in front of corresponding eyes of a wearer, and to display right and left pictures. The binocular displaying device comprises a measurement means. The method comprises a providing step during which at least one wearer related parameter is (Continued)

provided, the providing step including a measurement operation. The measurement operation may be performed by using the measurement means embedded in the binocular displaying device. The method includes a display positioning determination step during which a right display positioning of the right picture on the right display element is determined and a left display positioning of the left picture on the left display element is determined. The display positioning determination step is performed based on at least one wearer related parameter.

26 Claims, 2 Drawing Sheets

(58) Field of Classification Search
USPC ......... 345/1.1–9, 420, 672; 348/53, 46, 247; 351/205, 209; 382/106
See application file for complete search history.

(56) References Cited

U.S. PATENT DOCUMENTS

| | | | | |
|---|---|---|---|---|
| 5,625,408 A * | 4/1997 | Matsugu | ............... | G06T 7/0022 348/231.6 |
| 5,726,807 A * | 3/1998 | Nakaoka | ............ | G02B 27/0172 359/630 |
| 5,768,024 A * | 6/1998 | Takahashi | .......... | G02B 27/0172 359/630 |
| 6,008,778 A * | 12/1999 | Takahashi | .......... | G02B 27/0172 345/7 |
| 6,151,061 A * | 11/2000 | Tokuhashi | ............... | G02B 7/12 345/8 |
| 6,239,771 B1 * | 5/2001 | Usuki | ...................... | G02B 7/12 340/980 |
| 6,388,639 B1 * | 5/2002 | Hoshino | ............ | G02B 27/0093 345/7 |
| 6,449,309 B1 | 9/2002 | Tabata | | |
| 2002/0113755 A1 * | 8/2002 | Lee | ........................... | G02B 7/12 345/7 |
| 2004/0027451 A1 * | 2/2004 | Baker | .................. | H04N 5/2259 348/46 |
| 2005/0190180 A1 * | 9/2005 | Jin | ..................... | H04N 13/0018 345/419 |
| 2007/0153374 A1 * | 7/2007 | Travers | .................. | G02B 23/18 359/412 |
| 2009/0102915 A1 * | 4/2009 | Arsenich | .................. | G02B 5/10 348/53 |
| 2010/0110374 A1 * | 5/2010 | Raguin | ................ | A61B 3/1216 351/206 |
| 2010/0295928 A1 * | 11/2010 | De La Barre | ...... | G02B 27/2214 348/51 |
| 2011/0052009 A1 * | 3/2011 | Berkovich | ............ | G02B 27/01 382/106 |
| 2011/0069210 A1 * | 3/2011 | Ogura | .................... | H04N 5/359 348/247 |
| 2011/0102549 A1 * | 5/2011 | Takahashi | .............. | A61C 1/084 348/46 |
| 2011/0102558 A1 | 5/2011 | Moliton et al. | | |
| 2011/0142426 A1 * | 6/2011 | Sasaki | ................ | G11B 20/1217 386/337 |
| 2011/0170064 A1 * | 7/2011 | Taylor | .................. | A61B 3/0083 351/209 |
| 2011/0184830 A1 * | 7/2011 | Guilloux | ................ | G02C 7/065 351/159.06 |
| 2011/0194029 A1 * | 8/2011 | Herrmann | ............ | G02B 27/017 348/569 |
| 2011/0304695 A1 * | 12/2011 | Lim | ................... | H04N 13/0409 348/46 |
| 2012/0147141 A1 * | 6/2012 | Sasaki | ................ | G11B 20/1217 348/43 |
| 2012/0257018 A1 * | 10/2012 | Shigemura | ......... | G02B 27/2214 348/46 |
| 2013/0050833 A1 | 2/2013 | Lewis et al. | | |
| 2013/0100400 A1 * | 4/2013 | Hofeldt | .................. | A61B 3/022 351/201 |
| 2013/0208014 A1 * | 8/2013 | Fleck | ................. | G06K 9/00684 345/672 |
| 2013/0208099 A1 * | 8/2013 | Ohmi | .................. | H04N 13/0409 348/54 |
| 2014/0063461 A1 * | 3/2014 | Yao | ........................ | A61B 3/113 351/210 |
| 2015/0077704 A1 * | 3/2015 | Carmon | .................. | A61B 3/028 351/159.74 |
| 2015/0310666 A1 * | 10/2015 | Meier | .................... | G06T 7/0046 345/420 |

FOREIGN PATENT DOCUMENTS

| | | |
|---|---|---|
| JP | 8005955 | 1/1996 |
| JP | 2010124191 | 6/2010 |
| KR | 20090076539 | 7/2009 |

OTHER PUBLICATIONS

International Preliminary Report on Patentability and Written Opinion of the International Searching Authority, dated Feb. 17, 2015, for International Application No. PCT/EP2013/066855 (6 pages).
International Search Report dated Oct. 10, 2013, for International Application No. PCT/EP2013/066855 (4 pages).

* cited by examiner

PICTURES POSITIONING ON DISPLAY ELEMENTS

CROSS REFERENCE TO RELATED APPLICATIONS

This application is a U.S. national stage application of International Application No. PCT/EP2013/066855 filed Aug. 13, 2013, which claims the benefit of priority to EP Application No. 12306006.3, filed Aug. 16, 2012; the entirety of each of said applications is incorporated herein by reference.

FIELD OF THE INVENTION

The invention relates to pictures positioning system and method for positioning pictures on display elements of a binocular displaying device.

BACKGROUND

The discussion of the background of the invention herein is included to explain the context of the invention. This is not to be taken as an admission that any of the material referred to was published, known or part of the common general knowledge at the priority date of any of the claims.

A binocular displaying device comprises a right display element and a left display element, respectively designed to be placed in front of a corresponding eye of a wearer, and to display right and left pictures.

Such a binocular displaying device is generally designed for an average wearer. As a result, it may present the drawback of not being optimized for the actual wearer. Consequently, it can quickly give rise to the wearer suffering dizziness and nausea.

Setting means may be used to adapt a binocular displaying device to a particular wearer. However, such setting means are fastidious to use.

One object of the invention is to provide pictures positioning system and method that do not present the drawbacks mentioned hereinabove.

SUMMARY

In particular, one object of the invention is to provide pictures positioning system and method enabling information content to be viewed while limiting visual fatigue and discomfort for the wearer of a binocular displaying device. Moreover, one object of the invention is to provide pictures positioning system and method making the setting easier.

To this end, the invention proposes a pictures positioning method for positioning pictures on display elements of a binocular displaying device, the binocular displaying device comprising a right display element and a left display element, respectively designed to be placed in front of a corresponding eye of a wearer, and to display right and left pictures, the binocular displaying device comprising measurement means, the method comprising:

a providing step during which at least one wearer related parameter is provided, the providing step comprising a measurement operation during which the at least one wearer related parameter is measured, the measurement operation being performed by using the measurement means embedded in the binocular displaying device; a display positioning determination step during which:

a right display positioning of the right picture on the right display element is determined, a left display positioning of the left picture on the left display element is determined, the display positioning determination step being performed based on the at least one wearer related parameter, the at least one wearer related parameter comprising:

the interpupillary distance of the wearer in close vision, in intermediary vision, or in far vision, and/or the distance between the center of the left pupil and the top of the wearer's nose in close vision, in intermediary vision, or in far vision, and the distance between the center of the right pupil and the top of the wearer's nose in close vision, in intermediary vision, or in far vision.

Thus, right and left pictures are simply and automatically displayed depending on at least one wearer related parameter so that said wearer views the information content under conditions that are best adapted to the wearer's physiology. Consequently, the physiological fatigue is minimized.

When the right and left display elements are respectively designed to display right and left videos, each video comprises a set of pictures, the providing step may be repeated several times during right and left videos display.

The pictures positioning method may comprise a pictures generation step during which right and left pictures to be displayed are generated based on the determined right and left display positioning.

For instance, the right and left pictures may be generated by setting pictures margins based on the determined right and left display positioning.

In some embodiments of the invention, the right and left pictures are generated from right and left pictures or data to be displayed is received from a source device.

The invention further proposes a computer program product comprising one or more stored sequences of instructions that are accessible to a processor and which, when executed by the processor, causes the processor to carry out steps of the method.

The invention further proposes a computer readable medium carrying one or more sequences of instructions of the computer program product.

The invention further proposes a pictures positioning system for positioning pictures on display elements of a binocular displaying device, the binocular displaying device comprising a right display element and a left display element, respectively designed to be placed in front of a corresponding eye of a wearer, and to display right and left pictures, the binocular displaying device comprising measurement means, the system comprising:

providing means configured to provide at least one wearer related parameter, the providing means being configured to measure the at least one wearer related parameter, the measurement being performed by using the measurement means embedded in the binocular displaying device, display positioning determination means configured to:

determine a right display positioning of the right picture on the right display element, determine a left display positioning of the left picture on the left display element, the display positioning determination being performed based on the at least one wearer related parameter, the at least one wearer related parameter comprising:

the interpupillary distance of the wearer in close vision, in intermediary vision, or in far vision, and/or the distance between the center of the left pupil and the top of the wearer's nose in close vision, in intermediary vision, or in far vision, and the distance between the center of the right pupil and the top of the wearer's nose in close vision, in intermediary vision, or in far vision.

The invention further proposes a binocular displaying system comprising:

a binocular displaying device comprising a right display element and a left display element, respectively designed to be placed in front of a corresponding eye of a wearer, and to display right and left pictures, the binocular displaying device comprising measurement means configured to measure at least one wearer related parameter, a remote pictures positioning system.

The picture positioning system may thus generate right and left pictures with right and left display positioning of the right and left pictures on the right and left display elements adapted to the wearer's physiology. The picture positioning system may further generate stereoscopic right and left pictures with perspective adapted to the wearer's physiology.

Unless specifically stated otherwise, as apparent from the following discussions, it is appreciated that throughout the specification discussions utilizing terms such as "computing," "calculating," "generating," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawing wherein.

DESCRIPTION

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
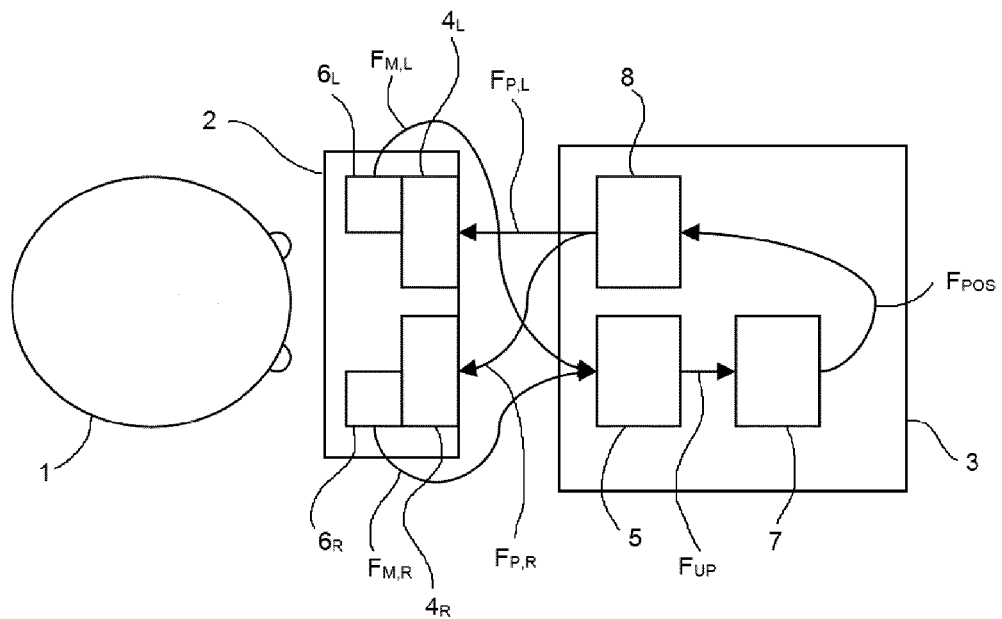
FIG. 1 is a schematic block diagram representing a wearer, a binocular displaying device, and a pictures positioning system according to some embodiments of the invention.

FIG. 1 represents a wearer 1, a binocular displaying device 2, and a pictures positioning system 3 according to some embodiments of the invention.

The binocular displaying device 2 comprises a right display element $4_R$ and a left display element $4_L$, respectively designed to be placed in front of a corresponding eye of the wearer 1, and to display right and left pictures. For instance, the right and left pictures are right and left stereoscopic pictures. Alternatively, the right and left pictures may be two identical pictures, for instance pictures containing informative data.

The right and left display elements $4_R$, $4_L$ may be display screens, for example LCD (liquid crystal display) screens. The display screens may be opaque screens or see-thru screens. More generally, the right and left display elements $4_R$, $4_L$ may be any type of display elements.

The pictures positioning system 3 may be embedded in the binocular displaying device 2, or may be a remote device configured to communicate with the binocular displaying device 2.

The pictures positioning system 3 comprises display positioning determination means 7 configured to determine a right display positioning of a right picture on the right display element $4_R$, and to determine a left display positioning of a left picture on the left display element $4_L$. The determination is made based on at least one wearer 1 related parameter.

According to some embodiments of the invention, the display positioning determination means 7 are automatic means.

In these embodiments, the system 3 further comprises providing means 5 configured to provide the at least one wearer 1 related parameter.

The at least one wearer related parameter may comprise the interpupillary distance of the wearer 1 in close vision, in intermediary vision, or in far vision. The interpupillary distance is defined in the standard ISO 13666:1998.

The at least one wearer related parameter may further or instead comprise two half interpupillary distances respectively defined by the distance between the center of the left pupil and the top of the wearer's nose in close vision, in intermediary vision, or in far vision, and the distance between the center of the right pupil and the top of the wearer's nose in close vision, in intermediary vision, or in far vision.

The close, intermediary, or far vision used to measure the wearer related parameter depends on the virtual distance of the pictures to be displayed.

The at least one wearer related parameter may further comprise the distance between the pupils of the wearer and the virtual distance of the pictures to be displayed.

Figure 4:
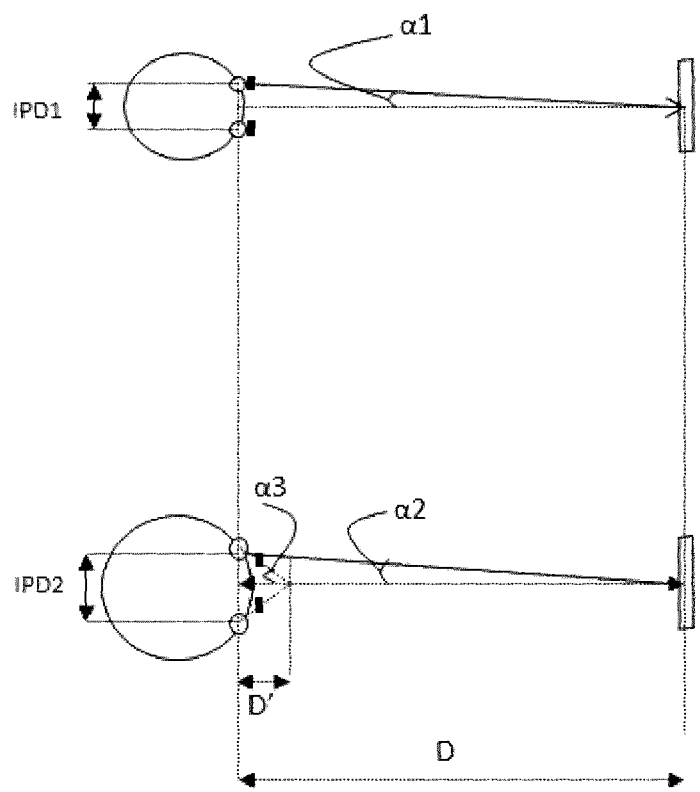
FIG. 4 is a schematic diagram representing two wearers presenting different interpupillary distances.

FIG. 4 represents two wearers presenting different interpupillary distances IPD1 and IPD2. We consider that the system is configured to display the pictures at a virtual distance D, that the display elements are designed for a wearer presenting the interpupillary distance IPD1, and that IPD2>IPD1.

Consequently, the vergence angle $\alpha 2$ is slightly greater than the vergence angle $\alpha 1$, and the virtual screen is not at the correct distance for the wearer presenting the interpupillary distance IPD2.

So, for watching the screen, the wearer presenting the interpupillary distance IPD2 has to have a vergence angle $\alpha 3$, which involves a virtual distance D' very different of the virtual distance D. This difference can quickly give rise to the wearer suffering dizziness and nausea.

Contrary to some parameters like vergence angle which can be set or adapted, the interpupillary distance and half interpupillary distances are distinguishing wearer related parameters. Consequently, these parameters make the determination of right and left display positioning possible.

According to some embodiments of the invention, the providing means 5 are configured to obtain the at least one wearer related parameter from a measurement.

The measurement may be performed by using measurement means, for example right and left cameras $6_L$ and $6_R$, embedded in the binocular displaying device 2, as symbolized by arrows $F_{M,L}$ and $F_{M,R}$.

The measurement may be performed periodically, for instance during right and left videos generation.

The display positioning determination means 7 are configured to receive the at least one wearer related parameter, as symbolized by arrow $F_{UP}$.

The display positioning determination means 7 then determine right and left display positioning of right and left pictures on the right and left display elements $4_R$, $4_L$, based on the received wearer 1 related parameter. For instance, the right and left display positioning may be determined by determining pictures margins to be set.

The system 1 further comprises generating means 8 configured to receive the right and left display positioning, as symbolized by arrow $F_{POS}$, and to generate right and left pictures based on the received right and left display positioning.

Figure 3:
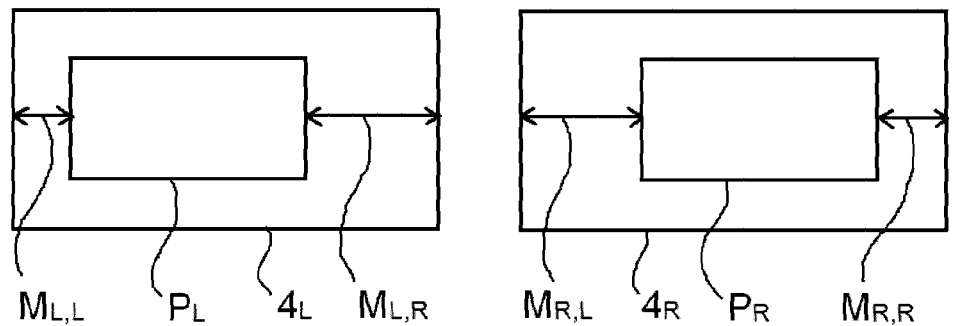
FIG. 3 is a schematic diagram representing right and left pictures displayed on right and left display elements of the binocular displaying device.

For instance, pictures margins are set based on the determined right and left display positioning. FIG. 3 shows the right display element $4_R$ and the left display element $4_L$ displaying respectively a right picture $P_R$ and a left picture $P_L$.

A first left margin $M_{R,L}$ is set between the left edge of the right display element $4_R$ and the left edge of the right picture $P_R$. A first right margin $M_{R,R}$ is set between the right edge of the right display element $4_R$ and the right edge of the right picture $P_R$. A second left margin $M_{L,L}$ is set between the left edge of the left display element $4_L$ and the left edge of the left picture $P_L$. A second right margin $M_{L,R}$ is set between the right edge of the left display element $4_L$ and the right edge of the left picture $P_L$.

According to some embodiments of the invention, the right and left pictures are synthetized, for example when the wearer is playing a video game. The margins may then be set during the synthetizing.

According to other embodiments of the invention, right and left picture are generated from right and left pictures or data to be displayed is received from a source device, for example when the wearer is watching a movie. The margins may then be set by processing the received pictures. In some cases, the size of the received pictures may have to be reduced to allow the positioning.

Then, the generated right and left stereoscopic pictures are transmitted to the right and left display elements $4_R$, $4_L$, as symbolized by arrows $F_{P,R}$ and $F_{P,L}$. The right and left pictures are then displayed on the right and left display elements $4_R$, $4_L$.

Figure 2:
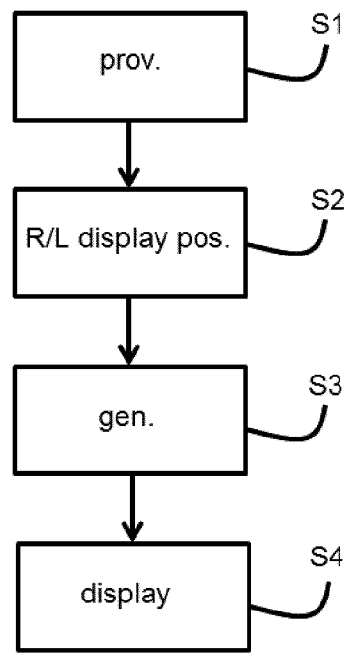
FIG. 2 is a flow chart showing steps of a pictures positioning method according to some embodiments of the invention.

Referring to FIG. 2, we are describing below a pictures positioning method according to an example embodiment of the invention. The method comprises:
a providing step S1,
a display positioning determination step S2,
a generating step S3, and
a displaying step S4.

The pictures positioning method may be implemented by the pictures positioning system 3 disclosed above.

During the providing step S1 at least one wearer 1 related parameter is provided.

Step S1 comprises a measurement operation during which the at least one wearer related parameter is measured.

As disclosed above, the measurement may be performed by using right and left cameras $6_L$ and $6_R$ embedded in the binocular viewing device 2.

Step S1 may be implemented periodically, for instance during right and left videos generation.

During the display positioning determination step S2 right and left display positioning of right and left pictures on the right and left display elements $4_R$, $4_L$ are determined based on the at least one wearer 1 related parameter.

Step S2 is implemented automatically, for instance by determining margins to be set to adapt the display to the interpupillary distance (or half interpupillary distances) of the wearer. The distance between the center of the right picture and the center of the left picture may for example be determined to correspond to the interpupillary distance of the wearer. Moreover, a shift may be provided depending on the half interpupillary distances.

During the generating step S3 right and left pictures are generated based on the received right and left display positioning. As disclosed above, the generating step may comprise a synthetizing operation during which pictures are synthetized, or a processing operation during which received pictures are processed.

The generating step S3 may instead comprises a setting on display elements to adjust their internal display margin, if they have this possibility. For instance, the setting may be performed by internal register programming, for example by $I^2C$ bus (Inter-Integrated Circuit) or any control register access by a processor unit. A mechanical adjustment may also be provided.

During the displaying step S4, the generated right and left stereoscopic pictures are transmitted to the right and left display elements $4_R$, $4_L$, and are displayed on the right and left display elements $4_R$, $4_L$.

The invention has been described above with the aid of embodiments without limitation of the general inventive concept.

The invention claimed is:

1. An improved system for binocular picture positioning:
    a binocular displaying device comprising:
    a right display element and a left display element, the right display element for presenting a right image to be displayed and the left display element for presenting a left image to be displayed; and
    a means for capturing pupillary parameters; and a control system for receiving the pupillary parameters from the binocular displaying device, the control system including logic that, when executed, causes the control system to perform operations comprising at least:

receive the pupillary parameters from the means for capturing the pupillary parameters;

calculate information about the pupillary parameters, the information including interpupillary distance, half interpupillary distance, a change in interpupillary distance, a change in half interpupillary distance, and a distance from pupils to the right image and the left image to be displayed;

determine positioning of the right image to be displayed for the right display element based at least in part on the information about the pupillary parameters;

determine positioning of the left image to be displayed for the left display element based at least in part on the information about the pupillary parameters;

generate the right image to be displayed or an active right image correction on the right display element based on the calculated information about the pupillary parameter; and generate the left image to be displayed or an active left image correction on the left display element based on the calculated information about the pupillary parameter.

2. The system of claim 1, wherein the right image to be displayed and the left image to be displayed are stereoscopic images.

3. The system of claim 1, wherein the right image and the left image to be displayed are two identical images.

4. The system of claim 1, wherein the right display element and the left display element are screens for projecting the right and left images, respectively.

5. The system of claim 1, wherein the information about the pupillary parameters includes interpupillary distance in any one or more of close vision, intermediary vision and far vision.

6. The system of claim 1, wherein the information about the pupillary parameters includes interpupillary distance in accordance with ISO 13666.

7. The system of claim 1, wherein the means for capturing pupillary parameters include a right camera associated with the right display element and a left camera associated with the left display element.

8. The system of claim 1, wherein the means for capturing is automatic.

9. The system of claim 1, wherein the determine positioning of the left and right images to be displayed includes determine margins about the left and right images on the respective left and right display elements.

10. The system of claim 1, wherein the determine positioning of the left and right images to be displayed includes determine margins about a synthetized image.

11. The system of claim 1, wherein the control system is further configured to receive data about the left and right images to be displayed from a data source and to process the data.

12. The system of claim 1, wherein the control system is further configured to adjust size of the left and right images to be displayed.

13. The system of claim 1, wherein the control system is embedded m the binocular displaying device.

14. The system of claim 1, wherein the control system is remote from the binocular displaying device.

15. A method for improved positioning of pictures on display elements of a binocular displaying device having a right display element and a left display element for placing in front of corresponding left and right eyes of a subject and for providing, respectively, a right image to be displayed and a left image to be displayed, the method comprising:

receiving pupillary parameters from a means for capturing pupillary parameters;

calculating information about the pupillary parameters, the information including interpupillary distance, half interpupillary distance, a change in interpupillary distance, a change in half interpupillary distance, and a distance from pupils to the right image and the left image to be displayed;

determining positioning of the right image to be displayed for the right display element based at least in part on the information about the pupillary parameters;

determining positioning of the left image to be displayed for the left display element based at least in part on the information about the pupillary parameters;

generating the right image to be displayed or an active right image correction on the right display element based on the calculated information about the pupillary parameter; and generating the left image to be displayed or an active left image correction on the left display element based on the calculated information about the pupillary parameter.

16. The method of claim 15, wherein the receiving the pupillary parameters includes receiving pupillary information about the left and right eyes using left and right cameras, respectively.

17. The method of claim 15, wherein the information includes interpupillary distance of the left and right eyes in any one or more of close vision, intermediary vision, and far vision.

18. The method of claim 15, wherein the information includes a distance between a center of a pupil of the left eye and a top of a nose and a distance between a center of a pupil of the right eye and a top of a nose of the subject.

19. The method of claim 15, wherein the method further comprises receiving data about the left and right images to be displayed from a data source and processing the data.

20. The method of claim 15, wherein the method further comprises receiving video data from a video data source and receiving the pupillary parameters while displaying the video data through the left and right display elements.

21. The method of claim 15, wherein the method further comprises repeating more than twice the receiving pupillary parameters.

22. The method of claim 15, wherein the generating the left and right images to be displayed includes setting margins about the left and right images based at least in part on the information about the pupillary parameters.

23. The method of claim 15, wherein the method is performed by the binocular displaying device.

24. The method of claim 15, wherein the method is performed by a remote device in operable communication with the binocular displaying device.

25. A computer program product comprising one or more stored sequences of instructions that are accessible to a processor and which, when executed by the processor, causes the processor to carry out the steps of:

receiving pupillary parameters from a means for capturing pupillary parameters;

calculating information about the pupillary parameters, the information including interpupillary distance, half interpupillary distance, a change in interpupillary distance, a change in half interpupillary distance, and a distance from pupils to a right image and a left image to be displayed;

determining positioning of the right image to be displayed for a right display element based at least in part on the information about the pupillary parameters;

determining positioning of the left image to be displayed for a left display element based at least in part on the information about the pupillary parameters;

generating the right image to be displayed or an active right image correction on the right display element based on the calculated information about the pupillary parameter; and generating the left image to be displayed or an active left image correction on the left display element based on the calculated information about the pupillary parameter.

26. A computer readable medium carrying one or more sequences of instructions of the computer program product of claim 25.

\* \* \* \* \*